R. T. OGDEN.
Sled.

No. 215,962.  Patented May 27, 1879.

WITNESSES:
Francis McArdle
C. Sedgwick

INVENTOR:
R. T. Ogden
BY Munn & Co
ATTORNEYS.

UNITED STATES PATENT OFFICE.

RICHARD T. OGDEN, OF PHILADELPHIA, PENNSYLVANIA.

IMPROVEMENT IN SLEDS.

Specification forming part of Letters Patent No. 215,962, dated May 27, 1879; application filed March 28, 1879.

*To all whom it may concern:*

Be it known that I, RICHARD T. OGDEN, of Philadelphia, in the county of Philadelphia and State of Pennsylvania, have invented a new and useful Improvement in Sleds, of which the following is a specification.

My improvements are applicable to hand-sleds for "coasting;" and the invention consists in means for guiding the sled, and the application to the forward end of the seat-board of a fender, which serves also as a support for the pulleys of the guide-ropes.

The construction and operation will be explained in connection with the accompanying drawings, wherein—

Figure 1:
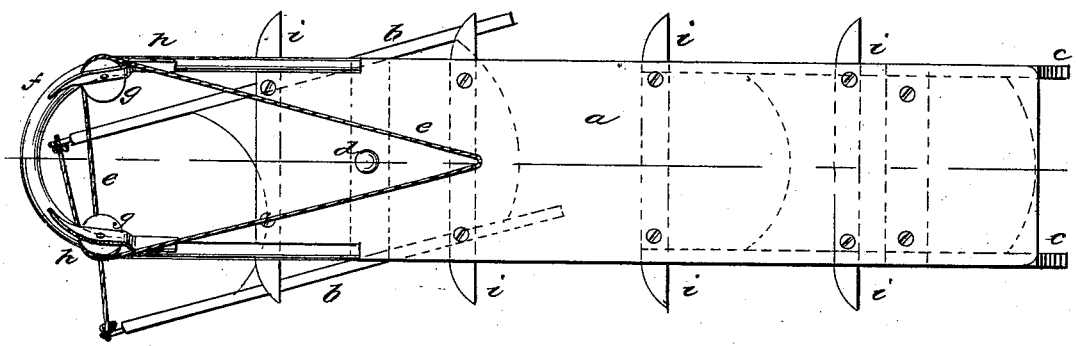
Figure 2:
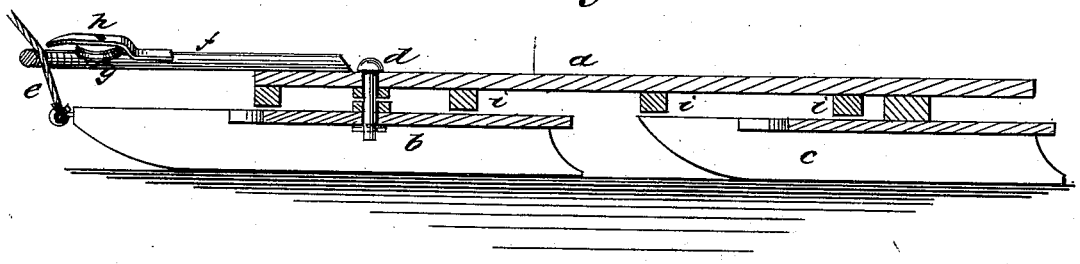

Figure 1 is a plan view of a sled constructed in accordance with my invention. Fig. 2 is a vertical longitudinal section.

Similar letters of reference indicate corresponding parts.

The sled consists of a seat-board, $a$, attached upon a pair, $b$, of forward runners and a second pair, $c$, of rear runners. The board $a$ is rigidly affixed upon the rear runners, $c$, while the forward pair, $b$, are connected together by a brace or board, and connected to board $a$ by a bolt, $d$, on which they swivel.

The forward ends of runners $b$ extend beyond board $a$, and a rope, $e$, is connected to the runners for drawing the sled by hand. This rope $e$ is also used for guiding the sled, as hereinafter described.

Attached rigidly upon the forward end of board $a$ is a fender, $f$, which, by preference, consists of a metal rod bent into a U shape, and with the ends attached upon board $a$ by bolts or rivets. The fender extends above and slightly beyond the forward ends of runners $b$, and carries upon each side a guide-roller, $g$. These guide-rollers are sustained upon pins that are fitted in the fender and in plates $h$, which are offset from the fender and cover the rollers $g$.

To guide the sled the rope $e$ is arranged as shown in Fig. 1—that is to say, the rope is brought back and up between the sides of the fender, then crossed, placed around rollers $g$, and the end carried back to be held in the hand of the rider. By pulling upon the rope $e$ slightly the forward runners are swung in either direction, as desired, and the sled will respond quickly to the direction.

The sled is adapted to carry a number of persons, and the seat-board $a$ is provided with four or more projecting foot-braces, $i$, at each side, against which the feet of the riders are placed.

The fender $f$ serves as a means for protecting the sled and its occupants in collisions and other accidents, besides being a support for the guide-rollers and giving purchase to the rope.

The shape and construction of the fender may be varied, and it may be formed by continuing the seat-board forward at each side.

Having thus described my invention, I claim as new and desire to secure by Letters Patent—

The combination, with a sled fitted with swiveling forward runners, of the fender $f$ and guide-rollers $g$, substantially as described and shown, and for the purposes set forth.

RICHARD THATCHER OGDEN.

Witnesses:
 FREDERIC JANES,
 WM. OGDEN.